United States Patent Office 3,499,938
Patented Mar. 10, 1970

---

3,499,938
CONVERSION OF KETONES TO CARBINOLS
Yu-Tang Hwang, Crystal Lake, William A. Krewer, Arlington Heights, and Walter J. Sandner, Crystal Lake, Ill., assignors to Union Oil Company of California, Union Oil Center, Los Angeles, Calif., a corporation of California
No Drawing. Filed Oct. 11, 1965, Ser. No. 494,955
Int. Cl. C07c 29/00
U.S. Cl. 260—617                4 Claims

ABSTRACT OF THE DISCLOSURE

Hydrogenation of ketones to their corresponding alcohols using a rhodium oxide and an alkali metal hydrogenation catalyst impregnated in an inert carrier.

---

This invention relates to a process for the conversion of ketones to carbinols. More particularly, this invention relates to the discovery that the use of rhodium (preferably promoted by alkali), as the catalyst for the hydrogenation of ketones to carbinols (secondary alcohols) gives high conversion per pass and high selectivity under relatively mild conditions.

It is well known that the carbonyl group, $>C=O$, lends itself to a wide variety of reactions, for example, hydrogenation, aldol-type condensation, bisulfite addition, cyanohydrin formation, Grignard reaction, ammonia condensation, and other substitution reactions attacking either carbonyl oxygen or alpha hydrogen. While such versatility in the chemical behavior has made the carbonyl compounds useful chemical intermediates, it invariably leads to the problems of side reactions or poor selectivity to the desired product. For instance, in the hydrogenation of acetone to isopropyl alcohol, mesityl oxide, mesitylene, MIBK, and diacetone alcohol are generally formed as a byproduct. Against this background, the instant invention provides a unique reaction for the carbonyl group in that conversions as high as 100% with selectivities to the hydroxyl compounds in the order of 99% are attained.

These unique results are attained by the use of rhodium as the catalyst for the hydrogenation of ketones to the corresponding carbinols. A preferred form of the catalyst is rhodium oxide incorporated on an alumina support. Another feature of this invention is the discovery that despite the fact that an alkali is known to promote aldolization, the presence of from about 2.0 to 10.0% by weight of an alkali with the rhodium-alumina catalyst makes possible the higher conversions and high selectivities found in accordance with this invention.

In general, this invention is directed to the reaction

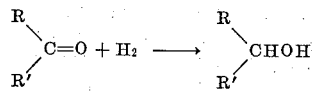

wherein R and R' are the same or different $C_1$ to $C_{20}$ alkyl (branched and straight chain), $C_3$ to $C_{20}$ cycloalkyl, or $C_6$ to $C_{20}$ aryl, or are connected to form a $C_3$ to $C_{30}$ cyclic ketone in the presence of a catalyst comprising about 0.1 to about 2.0 wt. percent rhodium, about 2.0 to about 10.0 wt. percent of an alkali and about 88% to about 98 wt. percent of alumina at a temperature of about 150° to 600° F.

It becomes a primary object of this invention to provide a process for the hydrogenation of ketones to the corresponding carbinols.

An object of this invention is to provide a novel catalyst composition for hydrogenating ketones to the corresponding carbinols.

Another object of this invention is to provide a rhodium-containing catalyst for the hydrogenation of ketones to the corresponding carbinols.

Still another object of this invention is to provide a rhodium oxide-alumina catalyst for this reaction.

Another object of this invention is to provide a process for the hydrogenation of ketones to the corresponding carbinols using a rhodium oxide catalyst promoted with an alkali.

Another object of this invention is to provide a process for the hydrogenation of ketones to the corresponding carbinols using a rhodium oxide catalyst promoted with potassium hydroxide.

Another object of this invention is to provide a process for the conversion of ketones such as acetone, methyl ethyl ketone, methyl isobutyl ketone, diisobutyl ketone, cyclopentanone, cyclohexanone, heptanone, octanone and dodecanone to the corresponding carbinols by hydrogenation in the presence of a catalyst comprising about 0.1% to about 2.0 wt. percent of rhodium oxide, about 2.0% to about 10.0 wt. percent of an alkali and about 88% to about 98 wt. percent of alumina at a temperature of about 150° to about 600° F.

These and other objects of this invention will become apparent or be described as the specification proceeds.

In order to demonstrate the invention, the following experiments were conducted. Two catalysts having the compositions shown in Table I were tested.

TABLE I

| Ingredient | Wt. percent | |
| --- | --- | --- |
| | Catalyst A | Catalyst B |
| Rhodium oxide (RhO) | 0.2 | 0.13 |
| Potassium hydroxide (KOH) | 4.5 | 9.87 |
| Alumina ($Al_2O_3$) | 95.3 | 85.5 |
| Silica ($SiO_2$) | Trace | |

Catalyst A was prepared by impregnating 183.8 g. of 1/8" x 1/8" alumina pellets (surface area 80 m.$^2$/g.) with 0.954 g. of rhodium nitrate (in 70 cc. $H_2O$). The pellets were dried at 450° F. and calcined at 950° F. for 2 hours. The calcined pellets were impregnated with 10.0 g. of KOH (85%) in 80 cc. of water. The pellets were then dried at 450° F. and again calcined at 600° F. Catalyst B was prepared by blending 250 g. Alcoa H41 activated alumina, 32.2 g. (85%) KOH, and 1.0 g. of rhodium nitrate, with 180 cc. water, followed by drying, pelletizing and calcination (900° F.). Acetone was hydrogenated to isopropyl alcohol under different conditions, as set forth in Table II, using catalysts A and B, which were reduced with hydrogen at about 600° F. in situ prior to Runs 1 and 5, respectively.

For comparison purposes, three more catalyst compositions were tested. Catalyst C was a commercially available catalyst containing 0.5 wt. percent RhO and 99.5 wt. percent $Al_2O_3$. Catalyst D was prepared by impregnating the alumina pellet with $PdCl_2$ (in dilute HCl solution) followed by calcination and contained about 0.5 wt. percent PdO and 99.5 wt. percent $Al_2O_3$ in the finished catalyst. Catalyst E was prepared by coating the alumina pellets with a slurry of PdO and KOH and contained approximately 0.5 wt. percent PdO, 5.0 wt. percent KOH and 94.5% wt. percent $Al_2O_3$. Results on Catalysts C and D are summarized in Table III and those on Catalyst E in Table IV.

Comparison of Run 7 with Runs 8, 9 and 10 clearly indicates that palladium-bearing catalyst is less active and less selective than rhodium-bearing catalyst. Furthermore,

TABLE II

| | Catalyst A | | | | Catalyst B | |
|---|---|---|---|---|---|---|
| Run No. | 1 | 2 | 3 | 4 | 5 | 6 |
| Catalyst age, hrs | 11–14 | 19–23 | 28–32 | 33–37 | 14–18 | 59–63 |
| Max. temperature, °F | 315 | 379 | 225 | 228 | 314 | 378 |
| Average temperature, °F | 276 | 368 | 204 | 201 | 299 | 370 |
| Pressure, p.s.i.g | 400 | 400 | 400 | 800 | 800 | 800 |
| Acetone, LVHSV | 0.141 | 0.143 | 0.156 | 0.151 | 0.279 | 0.291 |
| $H_2$/acetone, wt. ratio | 0.064 | 0.063 | 0.058 | 0.060 | 0.032 | 0.031 |
| Material recovery, percent | 88.1 | 92.3 | 103.6 | 95.4 | 98.9 | 91.2 |
| Conversion, percent based on acetone | 99.6 | 97.6 | 100.0 | 100.0 | 96.1 | 94.2 |
| Selectivity, percent based on acetone (averaged over a period specified): | | | | | | |
| MIBK | | 0.7 | | | 0.6 | 2.7 |
| DIBK | | trace | | | | 1.2 |
| MIBC | 1.4 | 8.6 | 1.0 | 0.4 | 2.0 | 6.3 |
| IPA | 98.6 | 88.4 | 99.0 | 99.6 | 97.4 | 89.8 |
| Mesityl oxide | | | | | N.D. | N.D. |
| Mesitylene | | | | | | |
| Others | | 2.3 | | | | |

TABLE III

| | Catalyst | | | |
|---|---|---|---|---|
| | C | D | | |
| Run No. | 7 | 8 | 9 | 10 |
| Catalyst age, hours | 7–9 | 20–24 | 29–33 | 38–42 |
| Maximum Bed Temp., °F | 202 | 392 | 481 | 600 |
| Average Bed Temp., °F | 195 | 375 | 465 | 566 |
| Pressure, p.s.i.g | 400 | 400 | 400 | 400 |
| Feed: | | | | |
| Acetone, LVHSV | 0.153 | 0.159 | 0.162 | 0.153 |
| $H_2$/acetone (wt.) | 0.058 | 0.057 | 0.056 | 0.059 |
| Material Recovery, % | 103.1 | 90.8 | 97.8 | 89.5 |
| Conversion, % based on acetone | 85.1 | 53.1 | 69.5 | 91.4 |
| Selectivities, percent based on acetone: | | | | |
| MIBK | 0.8 | 1.3 | 12.7 | 3.8 |
| DIBK | 0.1 | | 6.0 | 12.4 |
| MIBC | 0.1 | 4.0 | 11.9 | Trace |
| IPA | 69.4 | 61.7 | 44.1 | 0.6 |
| Mesityl oxide | 0.4 | N.D. | N.D. | N.D. |
| Mesitylene | 2.8 | | | |
| Others | 26.4 | 33.0 | 25.3 | 83.2 |

TABLE IV

| | Catalyst E | | | |
|---|---|---|---|---|
| Run No. | 11 | 12 | 13 | 14 |
| Catalyst age, hours | 23–25 | 32–34 | 41–43 | 55–57 |
| Maximum bed temp., °F | 390 | 482 | 330 | 302 |
| Average bed temp., °F | 382 | 477 | 327 | 298 |
| Pressure, p.s.i.g | 400 | 400 | 400 | 400 |
| Feed: | | | | |
| Acetone, LVHSV | 0.150 | 0.150 | 0.147 | 0.159 |
| $H_2$/acetone, (wt.) | 0.060 | 0.060 | 0.061 | 0.057 |
| Material recovery, percent | 100.5 | 101.0 | 99.5 | 70.6 |
| Conversion, percent based on acetone | 80.2 | 87.7 | 64.4 | 52.4 |
| Selectivities, percent based on acetone: | | | | |
| MIBK | 28.8 | 15.6 | 39.2 | 47.6 |
| DIBK | 20.7 | 11.5 | 11.4 | 9.3 |
| MIBC | 0.9 | 2.1 | 0.6 | |
| IPA | 2.6 | 4.5 | 1.7 | 2.9 |
| Mesityl oxide | | 0.1 | 0.5 | 1.2 |
| Mesitylene | 4.7 | 2.0 | 3.8 | 2.9 |
| Others | 42.3 | 64.2 | 42.8 | 36.1 |

The apparent gain or loss under material recovery was accounted for on a pro-rated basis. The "others" reported in the above tables was obtained by difference and accordingly any probable errors in the determination of MIBK, DIBK, etc. should have been reflected in these figures. The abbreviations MIBK, DIBK, MIBC and IPA stand for methyl isobutyl ketone, diisobutyl ketone, methyl isobutyl carbinol and isopropyl alcohol, respectively.

As seen from a comparison of Runs 1–6 with Run 7, the presence of KOH had a marked influence on the conversion and selectivity, e.g., on the yield of the desired product (IPA). The reaction proceeded at relatively lower temperatures, which appeared to enhance the selectivity toward IPA. The yield of IPA fell off as the average temperature rose (Runs 2 and 6) though other conditions were maintained substantially constant. Preliminary runs using the catalyst carrier alone (without KOH or RhO) showed no activity for this reaction.

palladium-bearing catalyst tends to show an appreciable selectivity toward MIBK, MIBC and DIBK which are all believed to form via the aldol-type condensation. This tendency is further enhanced by adding KOH to the PdO—$Al_2O_3$ catalyst as shown in Runs 11 through 14. It is to be emphasized that KOH promotes the RhO—$Al_2O_3$ catalyst to yield isopropyl alcohol from acetone at nearly 100% selectivity whereas the same KOH demotes the PdO—$Al_2O_3$ catalyst to yield isopropyl alcohol at a mere few percent selectivity while promoting the side reaction (aldolization) to a predominant level.

The invention is also illustrated by the following specific examples.

EXAMPLE I

Methyl ethyl ketone is hydrogenated by contact in the presence of hydrogen with a catalyst comprising about 0.1 wt. percent of RhO, 5.0 wt. percent of KOH and 94.9 wt. percent of $Al_2O_3$ using a LVHSV of about 0.3, a pressure of about 500 p.s.i.g. and a temperature of about 250° F. to produce good yields of methyl ethyl carbinol.

EXAMPLE II

MIBK is hydrogenated by contact in the presence of hydrogen with a catalyst comprising about 0.8 wt. percent of RhO, 6.0 wt. percent of KOH and 93.2 wt. percent of $Al_2O_3$ using a LVHSV of about 0.15, a pressure of about 425 p.s.i.g. and a temperature of about 300° F. to produce good yields of MIBC.

EXAMPLE III

DIBK is transformed into diisobutyl carbinol in accordance with the conditions set forth in Example II.

As seen from the specific examples of this invention, the reaction is carried out in the vapor phase or the gas-liquid mixed phase under the following conditions:

TABLE V

| Condition: | Range |
|---|---|
| Temperature, °F. | 150–600 |
| Pressure, p.s.i.g. | 10–800 |
| Ketone, LVHSV | 0.10–3.0 |
| $H_2$/ketone mole ratio | 1.0–5.0 |

As pointed out earlier, temperature affects the selectivity to a very significant level. Temperature also affects the conversion per pass if it is sufficiently low to allow the kinetics to play a predominant role. Thus, selection of operating temperature is a matter of compromise between selectivity and conversion per pass. For ketones which melt above 450° F., the reaction may be carried out in the liquid phase below this temperature by using an inert solvent so that high selectivity at high conversion may be obtained. A moderately high pressure is desirable, both from thermodynamic and kinetic standpoints. However, the effect of pressure is not appreciable unless the other operating conditions are such that the conversion of ketone is far from equilibrium and the equilibrium relationship is unfavorable for the carbinol at low pressures. Space velocity definitely affects the conversion per pass (prior to reaching equilibrium) but does not seem to have a profund effect on the selectivity. An excess of hydrogen appears to help maintain the catalyst activity as well as to enhance the conversion per pass.

The catalyst used in accordance with this invention is prepared by any of the known methods whereby an inert carrier, such as alumina, is impregnated with or coated with the specified amounts of rhodium oxide (preferably via soluble salt) and alkali. A suitable, and preferred, carrier consists of about 90.0–100.0 wt. percent pure $Al_2O_3$ with up to about 10% of silica or other oxides being present. The alumina carrier (so-called activated alumina) preferably has a surface area of about 50–200 sq. meters per gram.

The most satisfactory method of preparing the catalyst used in accordance with this invention is to first impregnate alumina in particulate form such as pellets, beads or cubes with a soluble rhodium salt such as the acetate, nitrate, or chloride, which is decomposable by calcination. The step of impregnation is carried out at room temperature using the requisite amount of rhodium salt to attain about 0.1–2.0 wt. percent of rhodium in the final catalyst composition. After reducing this catalyst with hydrogen immediately before use at temperatures from about 500° to about 650° F. or after the catalyst is placed on stream for a certain period under normal reacting conditions, most or all of the rhodium is present as free rhodium and/or the monoxide having the form RhO, with very little, if any, of the rhodium being present as the dioxide, $RhO_2$ or the sesquioxide, $Rh_2O_3$.

The next step is the calcining of the impregnated alumina which is conducted at a temperature of about 900°–2,000° F. The calcining is accomplished in the presence of an oxygen-containing gas which includes air and various oxygen and inert gas mixtures such as a mixture containing 50% or more of air with the balance being nitrogen, argon and helium. The first calcining step is carried out for at least about one hour and preferably for from two to four hours at the foregoing temperatures. The catalyst is then cooled and impregnated with the alkali solution. For this purpose, the hydroxides of alkali metals can be used, to include sodium hydroxide, potassium hydroxide, lithium hydroxide, and cesium hydroxide. For economical reasons, sodium hydroxide and/or potassium hydroxide are preferred. Mixtures of the alkali metal hydroxides can be used. The last step in the preparation of the catalyst is the final calcining which takes place in the presence of the aforedefined oxidizing gases at a temperature of 400° to 800° F. The second calcination, which is done primarily to stabilize the catalyst, need not be conducted at a temperature as high as the first step because the decomposition of hydroxide or salt is not intended. Other suitable methods of catalyst preparation include metal vaporization, metal spraying and the like. The catalyst can be prepared by slurring a mixture of all of the components with water, followed by drying of the slurry and shaping of the dried mixture into pellet form.

The embodiments of the invention in which an exclusive property or privilege is claimed are defined as follows:

1. The process of converting a saturated ketone to the corresponding carbinol which comprises passing a substantially gas phase mixture of hydrogen and said ketone over a catalyst comprising about 0.1–2.0 weight percent of rhodium oxide, 2.0–10.0 weight percent of an alkali metal hydroxide and 88–98% of an activated alumina at a temperature of about 150°–600° F., a pressure of about 10–800 p.s.i.g., a space velocity equivalent to 0.1 to 3.0 liquid volumes of ketone per hour per volume of catalyst, and a $H_2$/ketone mole ratio of about 1.0 to 5.0, said ketone being selected from the class consisting of acetone, methyl ethyl ketone, methyl isobutyl ketone, diisobutyl ketone, cyclopentanone, cyclohexanone, heptanone, octanone and dodecanone.

2. The method in accordance with claim 1 in which said catalyst comprises about 0.1 wt. percent to about 0.5 wt. percent rhodium oxide, and about 2.0 wt. percent to about 10.0% alkali.

3. The process in accordance with claim 1 in which said alkali metal hydroxide is potassium hydroxide.

4. The process in accordance with claim 1 in which said activated alumina contains up to 10% silica.

References Cited

UNITED STATES PATENTS

| | | |
|---|---|---|
| 2,549,416 | 4/1951 | Brooks. |
| 2,824,897 | 2/1658 | Wujciak et al. __ __ 260—638 |
| 3,126,426 | 3/1964 | Turnquest et al. _____ 252—466 |
| 3,271,325 | 9/1966 | Davies et al. _____ 252—466 |

FOREIGN PATENTS 648,822    9/1962    Canada.

LEON ZITVER, Primary Examiner

JOSEPH E. EVANS, Assistant Examiner

U.S. Cl. X.R.

252—466; 260—618, 638, 631, 596, 668